US012716004B2

(12) United States Patent
Stachowiak et al.

(10) Patent No.: US 12,716,004 B2

(45) Date of Patent: Aug. 25, 2026

(54) THERMAL-CURABLE COMPOSITION FOR INKJET ADAPTIVE PLANARIZATION

(71) Applicant: CANON KABUSHIKI KAISHA, Tokyo (JP)

(72) Inventors: Timothy Brian Stachowiak, Austin, TX (US); Weijun Liu, Cedar Park, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 248 days.

(21) Appl. No.: 18/465,503

(22) Filed: Sep. 12, 2023

(65) Prior Publication Data

US 2025/0084269 A1 Mar. 13, 2025

(51) Int. Cl.

| | |
|---|---|
| ***C08F 2/46*** | (2006.01) |
| ***C08F 2/50*** | (2006.01) |
| ***C08F 212/34*** | (2006.01) |
| ***C08G 61/04*** | (2006.01) |
| ***C09D 11/108*** | (2014.01) |
| ***C09D 11/38*** | (2014.01) |

(52) U.S. Cl.

CPC ............ *C09D 11/38* (2013.01); *C08F 212/34* (2013.01); *C09D 11/108* (2013.01); *C08F 2800/20* (2013.01)

(58) Field of Classification Search

CPC .... C08F 12/34; C08F 212/34; C08F 2800/20; C09D 11/108; C09D 11/30; C09D 11/101; C09D 11/38; C09D 125/02

USPC ................. 522/62, 6, 71, 189, 184, 1; 520/1

See application file for complete search history.

(56) References Cited

U.S. PATENT DOCUMENTS

| | | | | |
|---|---|---|---|---|
| 8,076,386 | B2 | 12/2011 | Xu | |
| 8,530,540 | B2 | 9/2013 | Kodama | |
| 2020/0021178 | A1 | 1/2020 | Romero | |
| 2020/0201178 | A1 * | 6/2020 | Wan | C09D 4/00 |
| 2021/0363377 | A1 | 11/2021 | Wada | |

FOREIGN PATENT DOCUMENTS

| | | | | |
|---|---|---|---|---|
| JP | 02107611 | A * | 4/1990 | |
| JP | H02107611 | A | 4/1990 | |
| WO | WO-2022132356 | A1 * | 6/2022 | C09D 4/00 |

OTHER PUBLICATIONS

Yoshida et al, JP 02107611 Machine Translation, Apr. 19, 1990 (Year: 1990).*

International Search Report with regard to International Application No. PCT/US/2024/038986, dated Dec. 4, 2024, pp. 1-12.

* cited by examiner

*Primary Examiner* — Jessica Whiteley

(74) *Attorney, Agent, or Firm* — Abel Schillinger, LLP

(57) ABSTRACT

A curable composition can comprise a polymerizable material and an initiator, wherein the polymerizable material can comprise at least one multi-functional vinylbenzene monomer in an amount of at least 70 wt % based on the total weight of the polymerizable material; the at least one initiator includes an azo-compound; and wherein a cured layer of the curable composition has a linear shrinkage after a baking treatment at 350° C. of not greater than 3.0%.

18 Claims, 1 Drawing Sheet

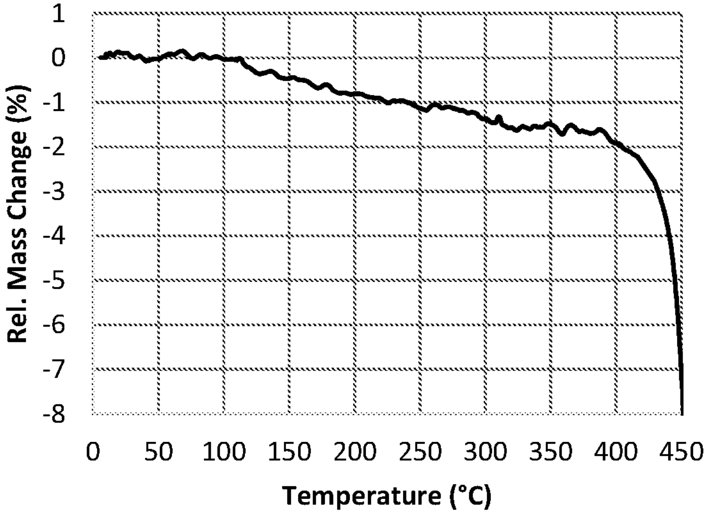
1
0
-1
-2
-3
-4
-5
-6
-7
-8
Rel. Mass Change (%)
0 50 100 150 200 250 300 350 400 450
Temperature (°C)

THERMAL-CURABLE COMPOSITION FOR INKJET ADAPTIVE PLANARIZATION

FIELD OF THE DISCLOSURE

The present disclosure relates to a curable composition, particularly to a thermal curable composition adapted for inkjet adaptive planarization.

BACKGROUND

Inkjet Adaptive Planarization (IAP) is a process which planarizes a surface of a substrate, e.g., a wafer containing an electronic circuit, by jetting liquid drops of a curable composition on the surface of the substrate, and bringing a flat superstrate in direct contact with the added liquid to form a flat liquid layer. The flat liquid layer is typically solidified under UV light exposure, and after removal of the superstrate a planar surface is obtained which can be subjected to subsequent processing steps, for example baking, etching, and/or further deposition steps. A disadvantage of UV-curable compositions is that the superstrate and superstrate chuck must be transparent, which restricts, for example, the material selection of these parts. There exists a need for curable compositions for IAP which can be thermally cured to form layers with high thermal stability and do not require a transparent superstrate.

SUMMARY

In one embodiment, a curable composition can comprise a polymerizable material and an initiator, wherein the polymerizable material may comprise at least one multi-functional vinylbenzene monomer in an amount of at least 70 wt % based on the total weight of the polymerizable material; the at least one initiator can include an azo-compound; and wherein a cured layer of the curable composition can have a linear shrinkage after a baking treatment at 350° C. of not greater than 3.0%. In one aspect of the curable composition, the linear shrinkage can not be greater than 1.8%.

In one aspect, the curable composition can be essentially free of particles.

In another aspect of the curable composition, the amount of the initiator can be at least 2 wt % based on a total weight of the curable composition.

In a further aspect of the curable composition, the azo-compound can include 1,1'azobis(cyclohexane carbonitrile) (ACHN), 2,2'-azobisisobutyronitrile (AIBN), or a combination thereof.

In one aspect of the curable composition, the amount of the initiator can be at least 2 wt % based on a total weight of the curable composition.

In one embodiment of the curable composition, the at least one multi-functional vinylbenzene can include a divinylbiphenyl (DVBPh) monomer, or a trivinylbiphenyl (TVBPh) monomer, or a combination thereof. In one aspect, the polymerizable material of the curable composition can consist essentially of the DVBPh monomer and the TVBPh monomer.

In a further aspect of the curable composition, a weight % ratio of the DVBPh monomer to the TVBPh monomer can range from 1:1 to 4:1.

In yet a further aspect of the curable composition, the amount of the polymerizable material can be at least 90 wt % based on the total weight of the curable composition.

In another aspect, the viscosity of the curable composition can not be greater than 30 mPa·s.

In a particular aspect, the curable composition can be essentially free of a solvent.

In one aspect, the polymerizable material of the curable composition can have a carbon content of at least 80 percent based on the total weight of the polymerizable material.

In another aspect, the curable composition can be essentially free of a solvent.

In yet another aspect, the curable composition can be designed for inkjet adaptive planarization (IAP).

In a further aspect, a cured layer of the curable composition can have an initial degradation temperature T(X) of at least 400° C.

In another embodiment, a laminate can comprise a substrate and a cured layer overlying the substrate, wherein the cured layer can be formed from the above-described curable composition. In one aspect of the laminate, an initial degradation temperature T(X) of the cured layer can be at least 400° C.

In a further embodiment, a method of forming a cured layer on a substrate can comprise: applying a layer of a curable composition on the substrate, wherein the curable composition comprises a polymerizable material and at least one initiator, the polymerizable material comprises at least one multi-functional vinylbenzene monomer in an amount of at least 70 wt % based on the total weight of the polymerizable material, and the at least one initiator includes an azo-compound; bringing the curable composition into contact with a superstrate; curing the curable composition to form a cured layer; and removing the template or the superstrate from the cured layer, wherein the cured layer has a linear shrinkage after a baking treatment at 350° C. of not greater than 3.0%.

In one aspect of the method, curing can comprise heating the curable composition to a temperature of at least 40° C. and not greater than 200° C.

In a certain aspect of the method, the azo-compound can include 1,1'azobis(cyclohexane carbonitrile) (ACHN); 2,2'-azobisisobutyronitrile (AIBN); or a combination thereof.

In one embodiment, a method of manufacturing an article can comprise: applying a layer of a curable composition on a substrate, wherein the curable composition can comprise a polymerizable material and at least one initiator, the polymerizable material comprising at least one multi-functional vinylbenzene monomer in an amount of at least 70 wt % based on the total weight of the polymerizable material, and the at least one initiator includes an azo-compound; bringing the curable composition into contact with a template or a superstrate; curing the curable composition to form a cured layer, wherein the cured layer; removing the template or the superstrate from the cured layer, wherein the cured layer has a thermal shrinkage after a baking treatment at 350° C. of not greater than 3.0%; forming a pattern on the substrate; processing the substrate on which the pattern has been formed in the forming; and manufacturing an article from the substrate processed in the processing.

In a certain aspect of the method, curing can comprise heating the curable composition to a temperature of at least 40° C. and not greater than 200° C.

BRIEF DESCRIPTION OF THE DRAWINGS

Embodiments are illustrated by way of example and are not limited in the accompanying FIGURES.

FIG. 1 includes a graph illustrating a TGA curves obtained via dynamic thermogravimetry of a sample of a cured layer formed from curable composition S1 according to one embodiment.

DETAILED DESCRIPTION

The following description is provided to assist in understanding the teachings disclosed herein and will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a curable composition comprising a polymerizable material and an initiator, wherein the polymerizable material can comprise at least one multi-functional vinylbenzene monomer in an amount of at least 70 wt % based on the total weight of the polymerizable material; the at least one initiator includes an azo-compound; and a cured layer of the curable composition can have a linear shrinkage after a baking treatment at 350° C. of not greater than 3.0%.

As used herein, the term "linear shrinkage" relates to the shrinkage of a cured layer of the curable composition, wherein the cured layer has a thickness between 500 nm and 700 nm and the cured layer is subjected to a baking treatment for 2 minutes on a hotplate having a temperature of 350° C. The linear shrinkage expresses the measured change in the thickness direction of the cured layer before and after the baking treatment.

The curable composition of the present disclosure can be very suitable for inkjet adaptive planarization (IAP) processing by combining the properties of having a low viscosity while not including solvents, and forming during curing a cured layer having an exceptionally high thermal stability.

In one embodiment, the cured layer formed from the curable composition of the present disclosure can have a linear shrinkage after the baking treatment at 350° C. of not greater than 2.8%, not greater than 2.5%, not greater than 2.0%, not greater than 1.8%, not greater than 1.5%, or not greater than 1.0%.

In one particular aspect, the initiator for the polymerization of the curable composition can be an azo-compound selected from 1,1'azobis(cyclohexane carbonitrile) (ACHN); 2,2'-azobisisobutyronitrile (AIBN); or a combination thereof.

The amount of the azo-compound initiator can be at least 1.0 wt % based on the total weight of the curable composition, or at least 1.5 wt %, or at least 2.0 wt %, or at least 2.5 wt %, or at least 3.0 wt %, or at least 3.5 wt %, or at least 4.0 wt %. In another aspect, the amount of the azo compound may be not greater than 10 wt % based on the total weight of the curable composition, or not greater than 8 wt %, or not greater than 7 wt %, or not greater than 6 wt %, or not greater than 5 wt %, or not greater than 4 wt %. The amount of the azo-compound initiator can be a value between any of the minimum and maximum numbers noted above.

The polymerizable material of the curable composition can be a major amount of the curable composition. In one embodiment, the amount of the polymerizable material can be at least 60 wt % based on the total weight of the curable composition, or at least 70 wt %, or at least 80 wt %, or at least 90 wt %, or at least 92 wt %, or at least 95 wt %. In another aspect, the amount of the polymerizable material may be not greater than 99 wt % based on the total weight of the curable composition, or not greater than 97 wt %, or not greater than 96 wt %, or not greater than 90 wt %.

As used herein, the term "multi-functional vinylbenzene" relates to a polymerizable monomer containing one or more benzene rings and at least two vinyl groups directly attached to the one or more benzene rings. In one aspect, the multi-functional vinylbenzene can include a divinylbiphenyl (DVBPh) monomer, or a trivinylbiphenyl (TVBPh) monomer. In a certain aspect, the multi-functional vinylbenzene is not limited to containing as functional groups vinyl groups, but can contain in addition other functional groups, for example acrylate groups, such as one acrylate group and two vinyl groups.

Some non-limiting example structures of multi-functional vinylbenzene monomers can be:

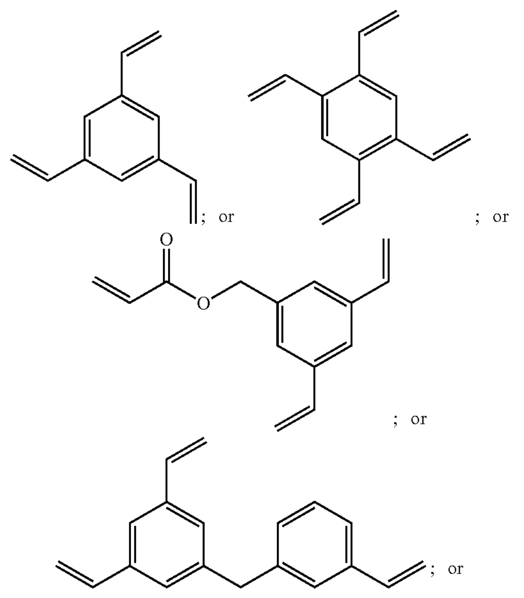

; or ; or ; or ; or

-continued

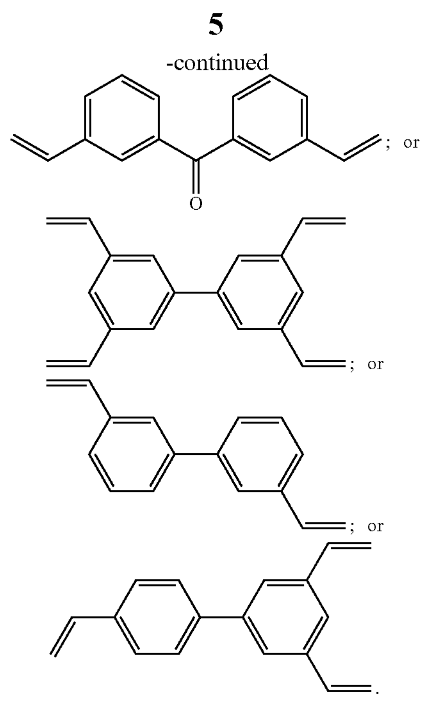

; or

; or

; or

.

In one embodiment, the curable composition can consist essentially of at least one DVBPh monomer and at least one TVBPh monomer. In one aspect, the weight % ratio of the at least one DVBPh monomer to the at least one TVBPh monomer can be at least 1:1, or at least 1.5:1, or at least 2:1, or at least 2.5:1, or at least 3:1, or at least 3.5:1, or at least 4:1. In another aspect, the weight % ratio of the at least one DVBPh monomer to the at least one TVBPh monomer may be not greater than 10:1; or not greater than 5:1, or not greater than 3:1. In a particular aspect, the weight % ratio of the at least one DVBPh monomer to the at least one TVBPh monomer can range from 1:1 to 4:1.

In one embodiment, the amount of the multi-functional vinylbenzene monomer can be at least 70 wt % based on the total weight of the polymerizable material, such at least 75 wt %, at least 80 wt %, at least 85 wt %, at least 90 wt %, or at least 95 wt. In another aspect, the amount of the multi-functional vinylbenzene monomer can be not greater than 98 wt % based on the total weight of the polymerizable material, or not greater than 95 wt %, or not greater than 90 wt %, or not greater than 85 wt %, or not greater than 80 wt %. The amount of the multi-functional vinylbenzene monomer can be a value between any of the minimum and maximum numbers noted above. In a certain aspect, the polymerizable material can consist essentially of the multi-functional vinylbenzene monomer. As used herein, consisting essentially of the multi-functional vinylbenzene monomer means that an amount of monomers which are not multi-functional vinylbenzene monomers is not greater than 1 wt % based on the total weight of the polymerizable material, or not greater than 0.5 wt %, or not greater than 0.1 wt %.

In another embodiment, the polymerizable material can comprise up to 30 wt % of polymerizable monomers, oligomers, or polymers which are not multi-functional vinyl-monomers. For example, in one aspect the polymerizable material can comprise a multi-functional acrylate monomer comprising at least two acrylate groups, or at least three acrylate groups, or at least four acrylate groups. In a certain particular aspect, the multi-functional acrylate monomer may comprise at least one aromatic ring, for example, at least one benzene ring. As used herein, the term acrylate monomer relates to substituted and non-substituted acrylate monomers. Non-limiting examples of substituted acrylate monomers can be C1-C8 alkylacrylate, for example, methacrylate or ethylacrylate. Furthermore, as used herein, the term "vinyl group" does not relate to a vinyl group which is part of an acrylate group and is a functional group by itself.

In aspects, the amount of polymerizable monomers not being multi-functional vinyl monomers can be at least 1 wt % and not greater than 30 wt % based on the total weight of the polymerizable material, for example at least 5 wt %, or at least 10 wt %, at least 15 wt %, or at least 20 wt %, and not greater than 28 wt %, or not greater than 25 wt %, or not greater than 20 wt %, or not greater than 10 wt %.

In a particular aspect, the curable composition can be essentially free of a maleimide monomer. Essentially free of a maleimide monomer means herein that not more than 0.5 wt % of the polymerizable material may be a maleimide monomer. In another aspect, the curable composition can be free of a maleimide monomer.

In a certain embodiment, the curable composition of the present disclosure can be essentially free of a solvent. As used herein, if not indicated otherwise, the term solvent relates to a compound which can dissolve or disperse the polymerizable monomers but does not itself polymerize during the curing of the curable composition. The term "essentially free of a solvent" means herein an amount of solvent being not greater than 5 wt % based on the total weight of the curable composition. In a certain particular aspect, the amount of a solvent can be not greater than 3 wt %, not greater than 2 wt %, not greater than 1 wt %, or the curable composition can be free of a solvent, except for unavoidable impurities.

In another aspect, the curable composition and the present disclosure can comprise a solvent in an amount higher than 5 wt % based on the total weight of the curable composition. In a particular aspect, the amount of solvent can be at least 7 wt % based on the total weight of the curable composition, or at least 10 wt %, or at least 15 wt %, at least 20 wt %. In another aspect, the amount of solvent may be not greater than 25 wt %, or not greater than 20 wt %, or not greater than 10 wt % based on the total weight of the curable composition.

In another embodiment, in order to be suitable for IAP processing the curable composition of the present disclosure can be essentially free of particles, for example pigment particles. As used herein, being essentially free of particles means that the curable composition contains not more than 50 particles per ml having a size of 200 nm or greater.

In yet a further embodiment, the curable composition of the present disclosure may not include epoxide-group containing monomers, or epoxy-group containing oligomers, or acrylamides.

In one embodiment, the curable composition of the present disclosure can have a low viscosity which may allow the use of the composition in IAP applications. In one aspect, the viscosity of the curable composition at a temperature of 23° C. can be not greater than 50 mPa·s, such as not greater than 40 mPa·s, or not greater than 30 mPa·s, not greater than 20 mPa·s, not greater than 15 mPa·s, or not greater than 10 mPa·s. In another aspect, the viscosity may be at least 5 mPa·s, or at least 7 mPa·s. As used herein, all viscosity values relate to viscosities measured at a given temperature with the Brookfield method.

The polymerizable monomer can have a high carbon content, which can be one reason that a cured layer of the curable composition can have high temperature stability and high etch resistance. In one aspect, the carbon content of the polymerizable material can be at least 71% based on the total weight of the polymerizable material, or at least 75%, or at least 80%, or at least 84%, or at least 90%. Assumed there is no material loss during the curing of the curable composition, the carbon content of the cured layer can be about the same as the carbon content of the polymerizable material.

The curable composition can be adapted that a cured layer formed from the curable composition may have a high thermal stability. In one aspect, the onset temperature for the thermal degradation of the cured layer may be at least 300° C., or at least 330° C., or at least 350° C., or at least 375° C., or at least 400° C., or at least 425° C. As used herein, the onset temperature for the thermal degradation is also called "initial degradation temperature T(X)," and relates to the temperature in the TGA curve measured at a heat-rate of 10° C./minute wherein a deflection of the curve from the almost linear plateau is first observed, shortly before the steep degradation decline of the sample.

In a further aspect, the curable composition can contain at least one optional additive. Non-limiting examples of optional additives can be surfactants, dispersants, stabilizer, co-solvents, initiators, inhibitors, dyes, or any combination thereof.

In another embodiment, the present disclosure is directed to a laminate comprising a substrate and a cured layer overlying the substrate, wherein the cured layer can be formed from the curable composition described above.

In a certain aspect, the laminate can further include one or more layers between the substrate and the cured layer, for example an adhesion layer.

The present disclosure is further directed to a method of forming a cured layer. The method can comprise applying the curable composition described above on a substrate; bringing the curable composition into contact with a template or superstrate; curing the curable composition to form the cured layer; and removing the template or superstrate from the cured layer.

In one aspect of the method, the curing can comprise heating the curable composition to a temperature of at least 40° C., or at least 50° C., or at least 60° C., or at least 80° C., or at least 100° C., or at least 120° C., or at least 140° C., or at least 160° C., or at least 180° C. In another aspect, the temperature during curing may be not greater than 260° C., or not greater than 240° C., or not greater than 220° C., or not greater than 200° C., or not greater than 170° C., or not greater than 150° C.

In a certain embodiment of the method, in addition to thermally curing of the curable composition, curing with light may be conducted, herein also called photo-curing. In one aspect, photo-curing can be conducted before the thermal curing, in another aspect, photo-curing may be conducted after the thermal curing. The light can have a wavelength between 250 nm to 760 nm. In a preferred aspect, the photo-curing may be conducted with light having a wavelength between 300 nm and 450 nm.

The substrate and the solidified (cured) layer may be subjected to additional processing to form a desired article, for example, by including an etching process to transfer an image into the substrate that corresponds to the pattern in one or both of the solidified layer and/or patterned layers that are underneath the solidified layer. The substrate can be further subjected to known steps and processes for device (article) fabrication, including, for example, curing, oxidation, layer formation, deposition, doping, planarization, etching, formable material removal, dicing, bonding, and packaging, and the like. In a certain aspect, the substrate may be processed to produce a plurality of articles (devices).

The cured layer may be further used as an interlayer insulating film of a semiconductor device, such as LSI, system LSI, DRAM, SDRAM, RDRAM, or D-RDRAM, or as a resist film used in a semiconductor manufacturing process.

As further demonstrated in the examples, it has been surprisingly found that curable compositions designed for thermal curing by using certain combinations of azo-compounds as thermal initiator and a polymerizable material with a high amount of multi-functional vinylbenzene can be very suitable for IAP processing by forming cured layers with an exceptional heat stability.

EXAMPLES

The following non-limiting examples illustrate the concepts as described herein.

Example 1

Preparing of Curable IAP Compositions

A first series of curable compositions was prepared (samples S1, S2, and C1) comprising 100 parts of a polymerizable material, 3 parts of a thermal polymerization initiator, and 1 part of a surfactant (FS3100). The polymerizable material contained 70 wt % 3,3'-divinyl-1,1'-biphenyl (DVBPh) and 30 wt % 3,4',5-Trivinyl-1,1'-biphenyl (TVBPh) based on the total weight of the polymerizable material. The calculated carbon content of the polymerizable material was 93.1%. The compositions were varied by using different types of thermal polymerization initiators. The following thermal initiators were included: 1,1'-azobis (cyclohexane carbonitrile) (ACHN) (sample S1); 2,2'-azobisisobutyronitrile (AIBN) (sample S2); and for comparative examples lauroyl peroxide (LP) (sample C1), benzoyl peroxide (BP) (sample C2), and dicumyl peroxide (DP) (sample C3).

The curable compositions of the first series were thermally cured by forming a 500-700 nm thick liquid layer of the curable composition on a silicon substrate. Drops of the liquid curable composition were deposited on the silicon substrate at an approximate density of 50-70 nL per square centimeter of area. After applying the liquid curable composition onto the silicon substrate, a quartz substrate was carefully placed onto the liquid, in order to form a continuous liquid film between the silicon substrate and quartz substrate. Afterwards, the stack of silicon substrate/curable composition/quartz substrate was placed on a hotplate having a temperature of 140° C. for 2 minutes to conduct thermal curing. After the thermal curing treatment, the liquid layer was completely solidified and was allowed to cool down to room temperature (23° C.). After removing the superstrate, the thickness of the thermally cured layer was measured with a spectroscopic ellipsometer. The test was designed that the cured film has an average thickness between 500-700 nm in thickness.

The thermally cured layers were subjected to a baking treatment at 350° C. For the baking treatment the cured film to be tested was placed for two minutes on a hot plate having a temperature of 350° C. under nitrogen. The thickness of the film before and after the baking was measured with a JA Woollam Spectroscopic Ellipsometer M-2000 X-210. The linear shrinkage (St) was calculated as shrinkage in percent according to the equation: $St=((T_u-T_b)/T_u)\times100\%$, with $T_u$ being the thickness of the cured film before the baking. $T_b$ being the thickness of the film after baking.

A summary of the curable compositions and the high temperature baking treatment results can be seen in Table 1.

Table 1 further includes data of a second series of comparative photocurable compositions (C4 to C13). The comparative photocurable compositions were prepared using the same mixture of the polymerizable material as used for samples S1, S2, and C1-C3 described above, but instead of a thermal initiator, a variety of commercially known UV photo-initiators were included, such as: Irgacure 819 in amounts varying from 2 wt % to 6 wt %; Irgacure 907 in amounts varying from 2 wt % to 6 wt %, OXE1 in an amount of 2 wt %, OXE2 in an amount of 2 wt %, and OXE3 in an amount of 2 wt %, and the combination of 3 wt % Irgacure 819 and 3 wt % OXE2. The OXE-type initiators are oxime-ester initiators from BASF.

Photo-cured layers were formed from the comparable curable composition C2 to C11 by using a Dymax Blue-Wave® AX-550 LED light-curing system. For the forming of the photo-cure layer, a liquid film of the curable composition with a thickness of about 500-700 nm was placed on a silicon substrate, and thereafter a glass or quartz superstrate was placed on top of the liquid film, and the formed stack was radiated at room temperature (23° C.) with a LED lamp with a light intensity of about 40 mW/$cm^2$ at 365 nm and applying a curing energy dosage of 5 J/$cm^2$ or 10 J/$cm^2$.

The measurement of the linear shrinkage of the photo-cured layers during a baking treatment at 350° C. was conducted the same way as described above for the thermally cured layers.

The results of the measured linear shrinkage after the baking treatment at 350° C. demonstrate that thermal curing with the azo-compound initiators produced cured layers with the highest temperature stability. While some photo-initiators also produced thermally stable layers after photo-curing, the data demonstrate that thermally curing with the azo-compound initiators can lead to even better or at least the same quality of photo-cured layers.

TABLE 1

| Sample | Initiator/ Amount | Curing | Linear shrinkage-baking at 350° C. |
|---|---|---|---|
| S1 | ACHN- 3 wt % | Thermal- 2 min 140° C. | 1.0% |
| S2 | AIBN- 3 wt % | Thermal- 2 min 140° C. | 1.8% |
| C1 | LP- 3 wt % | Thermal- 2 min 140° C. | 3.5% |
| C2 | BO- 3wt % | Thermal- 2 min 140° C. | 1.9% |
| C3 | DP- 3 wt % | Thermal- 2 min 140° C. | 40.8 |
| C4 | I819/OXE2 3 wt %/ 3 wt % | Light- 5 J/cm2 | 3.5% |
| C5 | I819 2 wt % | Light- 10 J/cm2 | 8.3% |
| C6 | I819 3 wt % | Light- 5 J/cm2 | 7.7% |
| C7 | I819 4 wt % | Light- 10 J/cm2 | 4.1% |

TABLE 1-continued

| Sample | Initiator/ Amount | Curing | Linear shrinkage-baking at 350° C. |
|---|---|---|---|
| C8 | I819 6 wt % | Light- 10 J/cm2 | 2.2% |
| C9 | I907 2 wt % | Light- 10 J/cm2 | 9.0% |
| C10 | I907 4 wt % | Light- 10 J/cm2 | 6.5% |
| C11 | I907 6 wt % | Light- 10 J/cm2 | 4.9% |
| C12 | OXE1 2 wt % | Light- 10 J/cm2 | 18.8% |
| C13 | OXE2 2 wt % | Light- 10 J/cm2 | 2.5% |
| C14 | OXE3 2 wt % | Light- 10 J/cm2 | 2.5% |
| C15 | none | Thermal- 2 min 140° C. | 91.7% |

The curable compositions listed in Table all have low viscosities below 20 mPa s.

Dynamic Thermogravimetry

The thermal stability of the cured layers was further investigated via dynamic thermal gravimetric analysis (TGA) using a LINSEIS STA PT1000 instrument (Linseis Messgeraete GmbH, Germany). The measurements were conducted under nitrogen at a rate of 5 liter per hour.

For the TGA measurements, 25-35 mg of the test sample was placed in a crucible and the initial weight recorded. A reference crucible was used to monitor the weight change of the crucible due to the variation of the temperature. The sample was heated at a rate of 20° C./min and the weight loss of the sample with increasing temperature was recorded at intervals of 1 second. The relative weight percent change was calculated by using the weight loss divided by the total original weight of the sample.

FIG. 1 shows a dynamic TGA curve of the thermally cured composition of sample S1. The initial thermal decomposition temperature T(X) of the layer is about 400° C.

Measuring of the Linear Shrinkage

The cured film having a thickness in the range of 500-700 nm (thermally cured or photo-cured) was subjected to a high temperature baking treatment by placing the film for two minutes on a stainless-steel hot plate having the temperature of 350° C. under nitrogen. The thickness of the film before and after the baking was measured with a JA Woollam Spectroscopic Ellipsometer M-2000 X-210. The linear shrinkage (St) was calculated according to the equation: $St=(T_u-T_b)/T_u$, with $T_u$ being the thickness of the cured film before the baking, $T_b$ being the thickness of the film after baking.

Viscosities

The viscosities of the curable compositions are measured using a Brookfield Viscometer LVDV-II+Pro at 200 rpm, with a spindle size #18 and a spin speed of 135 rpm. For the viscosity testing, about 6-7 mL of sample liquid was added into the sample chamber, enough to cover the spindle head. The sample contained in the chamber was about 20 minutes equilibrated to reach the desired measuring temperature of 23° C. before the actual measurement was started. For all viscosity testing, at least three measurements were conducted and an average value was calculated.

Carbon Content

The carbon content was calculated as the percent of carbon atoms based on the total molecular weight of the compounds of the polymerizable material contained in the curable compositions.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A curable composition comprising a polymerizable material and at least one initiator, wherein the polymerizable material comprises at least one multi-functional vinylbenzene monomer in an amount of at least 95 wt % based on the total weight of the polymerizable material;

the multi-functional vinylbenzene monomer consists essentially of a divinylbiphenyl (DVBPh) monomer and a trivinylbiphenyl (TVBPh) monomer;

the at least one initiator includes an azo-compound; and a cured layer of the curable composition has a linear shrinkage after a baking treatment at 350° C. of not greater than 3.0%.

2. The curable composition of claim 1, wherein the linear shrinkage is not greater than 1.8%.

3. The curable composition of claim 1, wherein the curable composition is essentially free of particles.

4. The curable composition of claim 1, wherein the azo-compound includes 1,1'azobis (cyclohexane carbonitrile) (ACHN), 2,2'-azobisisobutyronitrile (AIBN), or a combination thereof.

5. The curable composition of claim 1, wherein an amount of the at least one initiator is at least 2 wt % based on a total weight of the curable composition.

6. The curable composition of claim 1, wherein a weight % ratio of the DVBPh monomer to the TVBPh monomer ranges from 1:1 to 4:1.

7. The curable composition of claim 1, wherein an amount of the polymerizable material is at least 90 wt % based on the total weight of the curable composition.

8. The curable composition of claim 1, wherein a viscosity of the curable composition is not greater than 30 mPa·s.

9. The curable composition of claim 1, wherein the polymerizable material has a carbon content of at least 80 percent.

10. The curable composition of claim 1, wherein the curable composition is essentially free of a solvent.

11. The curable composition of claim 1, wherein the curable composition is designed for inkjet adaptive planarization processing (IAP).

12. A laminate comprising a substrate and a cured layer overlying the substrate, wherein the cured layer is formed from the curable composition of claim 1.

13. The laminate of claim 12, wherein an initial degradation temperature T(X) of the cured layer is at least 400° C.

14. A method of forming a cured layer on a substrate, comprising:

applying a layer of a curable composition on the substrate, wherein the curable composition comprises a polymerizable material and at least one initiator, the polymerizable material comprises at least one multi-functional vinylbenzene monomer in an amount of at least 95 wt % based on the total weight of the polymerizable material, the multi-functional vinylbenzene monomer consists essentially of a divinylbiphenyl (DVBPh) monomer and a trivinylbiphenyl (TVBPh) monomer, and the at least one initiator includes an azo-compound;

bringing the curable composition into contact with a superstrate;

curing the curable composition to form a cured layer; and removing the template or the superstrate from the cured layer, wherein the cured layer has a thermal shrinkage after a baking treatment at 350° C. of not greater than 3.0%.

15. The method of claim 14, wherein curing comprises heating the curable composition to a temperature of at least 40° C. and not greater than 200° C.

16. The method of claim 14, wherein the azo-compound includes 1,1'azobis (cyclohexane carbonitrile) (ACHN), 2,2'-azobisisobutyronitrile (AIBN), or a combination thereof.

17. A method of manufacturing an article, comprising:

applying a layer of a curable composition on a substrate, wherein the curable composition comprises a polymerizable material and at least one initiator, the polymerizable material comprises at least one multi-functional vinylbenzene monomer in an amount of at least 95 wt % based on the total weight of the polymerizable material, the multi-functional vinylbenzene monomer consists essentially of a divinylbiphenyl (DVBPh) monomer and a trivinylbiphenyl (TVBPh) monomer, and the at least one initiator includes an azo-compound;

bringing the curable composition into contact with a template or a superstrate;

curing the curable composition to form a cured layer;

removing the template or the superstrate from the cured layer, wherein the cured layer has a thermal shrinkage after a baking treatment at 350° C. of not greater than 3.0%;

forming a pattern on the substrate;

processing the substrate on which the pattern has been formed in the forming; and manufacturing an article from the substrate processed in the processing.

18. The method of claim 17, wherein curing comprises heating the curable composition to a temperature of at least 40° C. and not greater than 200° C.

* * * * *